Nov. 22, 1955     H. F. GODWIN     2,724,227
ELEVATING MEANS FOR TRACTOR MOUNTED GANG MOWERS
Filed June 2, 1950     2 Sheets-Sheet 1

INVENTOR.
HIRAM F. GODWIN
BY
ATTORNEY

INVENTOR.
HIRAM F. GODWIN
BY
ATTORNEY

United States Patent Office 2,724,227
Patented Nov. 22, 1955

2,724,227

ELEVATING MEANS FOR TRACTOR MOUNTED GANG MOWERS

Hiram F. Godwin, Detroit, Mich.

Application June 2, 1950, Serial No. 165,747

1 Claim. (Cl. 56—7)

This invention relates to a power mower and more particularly to an implement wherein a plurality of mowers are carried by a frame member and each mower is independently movable relative to each other.

It is an object of the present invention to provide a frame structure which may be readily attached to a power unit, such as a tractor, wherein the mowers are carried by the frame structure within the limits of the power unit, as distinguished from the trailer type gang mowers.

It is another object of the invention to support the mower units from the frame through floating connections so that the mower units are independently movable relative to the frame to ride on irregular surfaces as in rough or undulating ground surfaces.

A further object of the invention is to provide a roll support for the mower units and to provide a floating power drive for the cutter reels from the power unit rather than a power drive through wheels driven by rolling contact with the ground.

A still further object of the invention is to provide pivoted suspensions for outwardly spaced mower units so that the units may be moved from a horizontal position toward a vertical position to thereby reduce the width of assembly.

Other objects and advantages of the invention will more fully appear from the following description taken in connection with the accompanying drawings in which.

Figure 1:
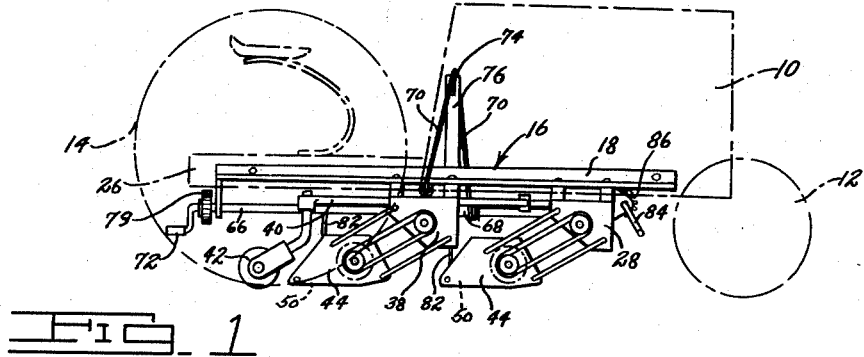
Fig. 1 is a side elevational view of the mower assembly applied to a tractor unit, shown in dot and dash lines.
Figure 2:
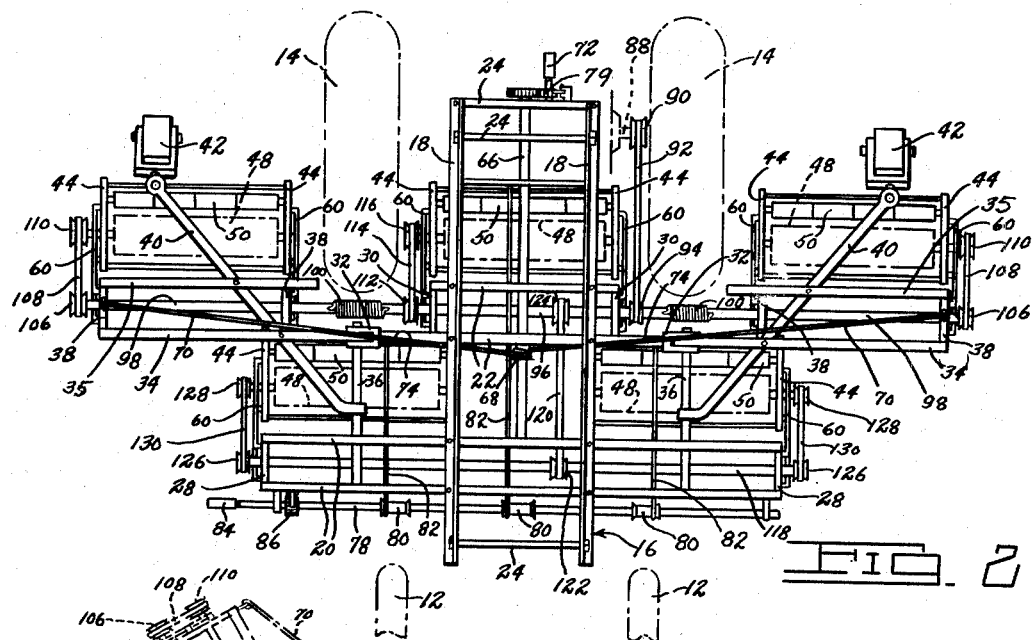
Fig. 2 is a top plan view of Fig. 1.

Referring to the drawings, I have shown the implement assembly applied to a tractor 10 having front wheels 12 and rear wheels 14.

A first frame unit 16 comprising longitudinally extending members 18 and transverse members 20, 22 and 24 are adapted to be secured to the tractor frame 26 between the front and rear wheels of the tractor. The transverse frame members 20 are provided with depending brackets 28 and the transverse frame members 22 are provided with depending brackets 30. One of the frame members 22, preferably the forward one, has its opposite ends provided with bifurcated ends 32 for receiving pivotally mounted extension frame members 34. A shaft 36, carried by the frame members 20, forms the pivotal connection between the transverse frame members 22 and 24.

Co-operating with the first frame unit is an auxiliary frame unit comprising frame members 34 and frame members 35 which are tied together by depending brackets 38. The frame members 34 and 35 are further tied together by diagonally extending frame members 40. One end of the frame members 40 is pivotally supported on the shaft 36. The opposite ends of the frame members 40 are provided with caster wheels 42.

By the above arrangement of frame members, I have provided a pair of spaced mower supports at the forward end of the frame members 18, and three mower supports at the rear of the front pair. The mower supports are arranged in staggered relation with a slight overlap.

Figure 6:
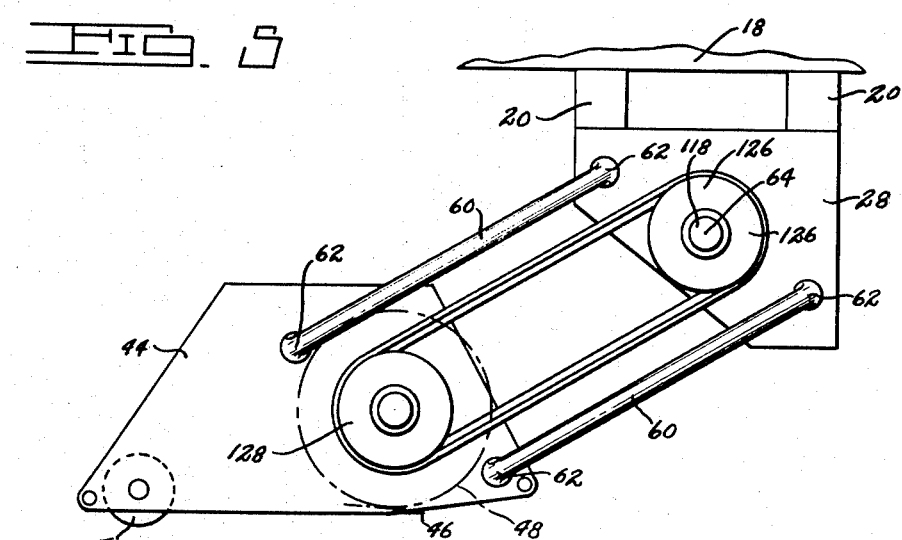
Fig. 6 is an enlarged fragmentary, side elevational view of the floating connection from the frame to the mower unit.

Each mower unit is supported from the frame construction in the same manner. For this reason, only one support will be described, which support is clearly shown in Fig. 6.

Side plates 44 carry the conventional cutter bars 46 and reels 48 of a mower unit and the plates are supported on the ground by rollers 50. The side plates 44 are carried by the plates or brackets 28 by parallel and spaced links 60 which are of equal length. The links 60 have their opposite ends pivotally supported respectively in the plates 28 and 44 at 62, thus providing a parallelogram construction which permits swinging of the mower unit about a center 64 on the frame members, maintaining the mower unit in a horizontal plane regardless of its vertical movement caused by irregular ground surfaces. Each mower unit is free to float and each moves independently of the other.

Figure 3:
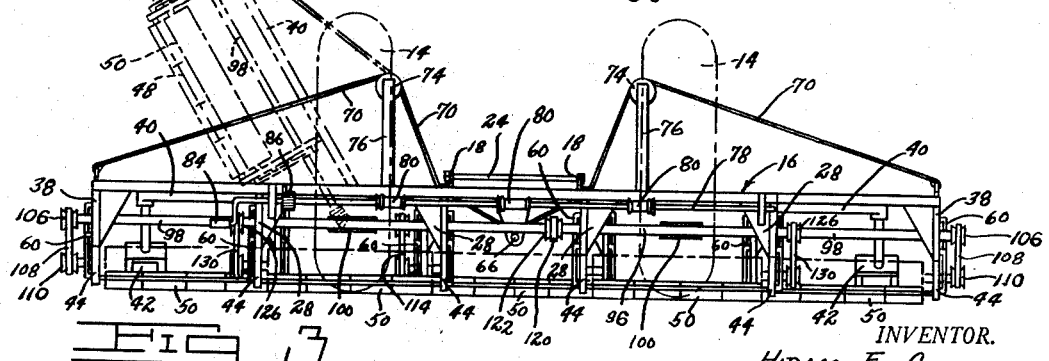
Fig. 3 is a front elevational view of Fig. 2.
Figure 4:
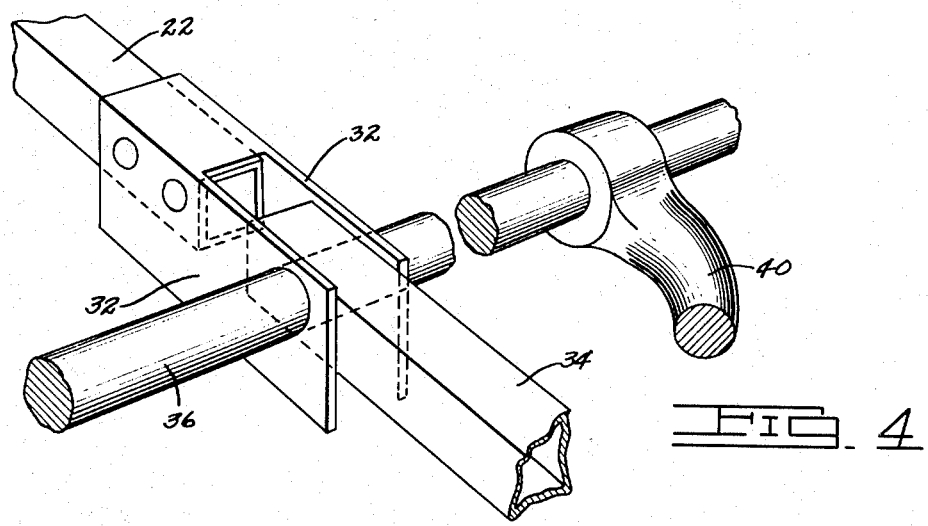
Fig. 4 is an enlarged perspective view of the pivotal connection for one of the side mowers to the frame with parts in section.

The outer side mower units, carried by the frame members 34, 36 and 40, are adapted for swinging movement about the longitudinal center of the shaft 36 so that they can be raised toward a vertical position, as indicated by the dot and dash lines in Fig. 3, to reduce the over all width of the implement or to clear obstructions in the path of travel. The raising of the outside units is accomplished by a construction comprising a shaft 66, rotatably supported on the frame 16, a drum 68, cables 70, and a crank 72. The cable 70 has one end secured to the drum 68 and the opposite end is attached to the outer end of the frame or bracket 38. The intermediate portion of the cable 70 passes over a pulley 74 which is supported by a vertical upright member 76. A dog and ratchet construction 79 is provided for holding the shaft 66 against turning when the mower units are in the raised position.

The three centrally located mower units may be raised above the ground, as might be required in moving the implement to location. A shaft 78, extending transversely of the frame 16, carries three drums 80 which are provided with cables 82 extending rearwardly over pulleys carried by the frame 16 and downwardly to the rear of the mower unit frame. A crank 84 is carried by the shaft 78 and a dog and ratchet mechanism 86 is provided to retain the shaft 78 in non-rotatable position.

Heretofore the reel of the mower units usually is driven by rotation of the supporting wheels for the mower unit, and this is particularly true in gang or tandem mowers. Each mower unit has been independently driven and driven at a speed in proportion to the speed of travel over the ground.

Figure 5:
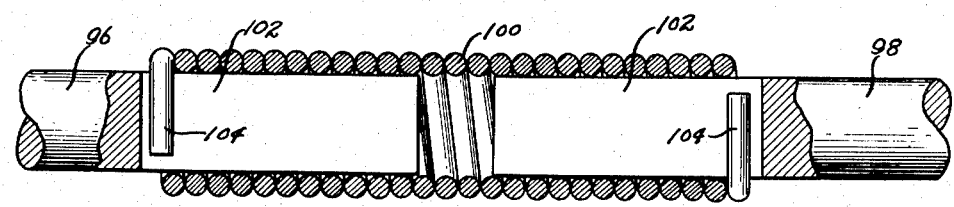
Fig. 5 is an enlarged longitudinal sectional view through the universal coupling in the power shaft for the pivotally supported side mowers.

The present invention provides a mechanism for driving the reels of the mower units from a common source, particularly from the source of power used to motivate the tractor or other power unit to which the mower units are attached. The reference numeral 88 designates a power take off shaft from the tractor transmission, the same being common to power driven implements. A pulley 90 is carried by the shaft 88 and drives a belt 92 which drives a pulley 94 mounted on a transverse shaft 96 supported by the frame 16. The shaft 96 has extension shafts 98 at its opposite ends which are carried by the pivotal frame members for the two outer side mower units. The ends of the shaft 96 are each connected to one end of the shafts 98 respectively by a flexible and expansible connection, here shown as a coil spring 100. The adjacent ends of the shafts 96 and 98 are slotted as at 102, Fig. 5, and receive radially bent ends 104 of the spring 100. The ends 104, in the slots 102, form a driving connection between the shafts 96 and 98 and at the same time permit relative angular movement of the shafts as is required in raising the outer mower units vertically. The spring 100 also permits relative longitudinal movement of the shafts 96 and 98 as required since the pivot point for the mower units is not in alignment with the pivot point of the drive shafts. Pulleys 106 are provided on the extension shafts 98. These pulleys, through belts 108, drive the reels 48 carrying pulleys 110. The shaft 96 is provided with a pulley 112 which drives the rear center mower reel 48 through belt 114 and pulley 116.

A transverse shaft 118, carried by the forward end of the frame 16, is driven by a belt 120 around pulleys 122 and 124 on the shafts 118 and 96 respectively. The opposite ends of the shaft 118 are provided with pulleys 126 which drive pulleys 128, secured to the two forward reels 48, through belts 130.

From the above, it will be seen that the mower units are each driven from a single source of power and that since the power is taken from the power take off shaft of the tractor the reels are rotated at a constant speed of rotation, thus avoiding the objectionable feature of having the reels rotate by depending upon the traction of mower unit wheels, heretofore used, with an irregular surface of the ground. The invention has a further advantage over mower units wherein the reel drive is from wheels on the mower units, in that when the tractor is in a lower gear for slow speed the reels are driven at the same rate of speed due to the drive taken from the power take off shaft. By this arrangement, the reels are rotating at a speed, during slow forward movement of the mowers, corresponding to a faster movement of forward travel. This is desirable on rough ground or thick and long grass.

By having the floating arrangement of the mower units the assembly follows the undulating contour of the ground surface, as part of the mowers are in planes at angles to other mowers.

While I have illustrated and described a preferred embodiment of the invention, it will be understood that various changes including the size, shape and arrangement of parts may be made without departing from the spirit of my invention and it is not my intention to limit its scope other than by the terms of the appended claim.

I claim:

A lawn mower implement comprising, a first frame, an auxiliary frame pivotally supported on said first frame at the opposite sides of said first frame, a mower unit including a cutter bar and a rotatable reel pivotally carried by each of said auxiliary frames, a power driving means carried by said first frame, a driving connection including a flexible shaft from said power driving means to the rotatable reel of each of said mower units, a diagonal frame member carried by each auxiliary frame pivotally supported at one end on said first frame whereby said auxiliary frames may be moved from a horizontal position toward a vertical position, and means carried by said first frame for raising said auxiliary frames and their mower units from a horizontal position toward a vertical position, whereby the width of the mower implement may be reduced without disconnecting the driving connection to said mower units.

References Cited in the file of this patent
UNITED STATES PATENTS

| | | |
|---|---|---|
| 1,900,726 | Moyer | Mar. 7, 1933 |
| 1,917,649 | Kinkead | July 11, 1933 |
| 2,058,048 | Worthington | Oct. 20, 1936 |
| 2,168,706 | George | Aug. 8, 1939 |
| 2,191,135 | Roth | Feb. 20, 1940 |
| 2,299,859 | Speiser | Oct. 27, 1942 |
| 2,325,252 | Krenzke | July 27, 1943 |
| 2,335,054 | Godwin | Nov. 23, 1943 |
| 2,475,671 | McCartney | July 12, 1949 |